United States Patent Office 3,382,081
Patented May 7, 1968

3,382,081

CHEMICAL COMPOSITION AND METHOD

Paul R. Cutter and Donald N. Hamilton, Painesville, Ohio, assignors to Diamond Shamrock Corporation, a corporation of Delaware No Drawing. Continuation-in-part of application Ser. No. 397,604, Sept. 18, 1964. This application Sept. 2, 1965, Ser. No. 484,747
26 Claims. (Cl. 106—14)

This application is a continuation-in-part of our copending application Ser. No. 397,604, filed Sept. 18, 1964, now abandoned.

This invention relates to corrosion inhibiting coatings for metallic surfaces such as ferrous metals, zinc, and aluminum, and more particularly to improved corrosion-inhibiting bonding coatings for securely bonding organic paint coatings to metal surfaces.

Various kinds of protective coatings for inhibiting corrosion and bonding organic paints to metallic surfaces have heretofore been proposed, most of which coatings contain an inorganic component such as chromic acid or phosphoric acid, or acidic salts of these acids as well as mixtures of the acids and salts, and where a hexavalent chromium compound is present, an organic component which is readily oxidized by the hexavalent chromium upon heating during the drying of the coating. In applying such coatings, the metal surface is first uniformly covered with the coating solution as by dipping, spraying, or "roller" coating and is then dried by heating the metal surface to a temperature of about 150° to 200° C. When the coating solution contains hexavalent chromium and an easily oxidized organic compound, such as a glycol, the coatings thus formed are amorphous, or varnish-like, in structure, and result in coatings which do not bond organic paints to the metal sufficiently securely to withstand the rigorous in-use conditions encountered in corrosive atmospheres and mechanical shock. For example, the adherence or bonding properties of most bonding coats containing easily oxidizable organic compounds and chromic acid or a chromate, are destroyed by severe conditions of mechanical impact, abrasion, flexing, deep-drawing, and contact with chemicals, such as soap, detergents and the like, typically encountered by metal surfaces in automobiles and electrical apparatus.

An object of the present invention is to provide a corrosion-inhibiting bonding coating solution containing chromic acid and prescribed polyfunctional aliphatic compounds, which bonding coating adheres strongly both to the basis metal and to organic paints under conditions of impact, abrasion, flexing, deep drawing, and corrosive environment.

A further object of the invention is to provide a corrosion-inhibiting bonding coating composition which forms a microcrystalline structure upon metal surfaces whereby the coating, upon heating forms a strongly adherent bond with both the metal surface and the organic paint film.

A further object is to provide a bonding coating which will not interfere with spot and seam welding and similar high-temperature operations to which the metal may be subject prior to painting.

Still another object is to provide a strongly adherent, corrosion-inhibiting bonding coating which is effective in painting metals by electrodeposition from water dispersions of organic paint media.

Other objects will be apparent to those skilled in the art from the description of the invention which follows hereinafter.

Contrary to the prior art teachings, it has now been found that a superior corrosion-inhibiting, bonding coating is formed when substantially all of the chromium in a solution containing hexavalent chromium in the form of chromic acid, and a polyfunctional aliphatic compound, remains bound in the hexavalent state, and further it has been found that if the polyfunctional aliphatic compound is first reacted with the chromic acid at ordinary temperatures so as to form an insoluble, polymeric microcrystalline substrate as opposed to an amorphous structure, upon heating at elevated temperatures such a coating develops a very high surface area, thus promoting adhesion of subsequently applied organic paints to the treated metal. Also, a bonding coat with these physical and chemical characteristics is not seriously affected in its corrosion-inhibiting and bonding properties by spot welding prior to painting the metal to which the coating adheres.

Accordingly, the present invention includes a composition for forming a bonding coat on a metallic surface, such composition consisting essentially of a volatile solvent medium containing:

(A) chromic acid in an amount between 1 and 400 grams per liter, and (B) an organic component which is composed of at least one aliphatic dicarboxylic acid selected from a first group consisting of (1) succinic acid in the amount of 60% to 90% by weight of said component, and (2) aliphatic dicarboxylic acids of the structure:

$$HOOC—(CH_2)_n—COOH$$

wherein $n$ is a whole number from 3 to 12 inclusive, with the remainder of said organic component being a polyfunctional aliphatic compound selected from a second group consisting of (1) aliphatic ketomonocarboxylic acids having from 4 to 14 carbon atoms in the molecules thereof, (2) unsaturated aliphatic carboxylic acids having from 3 to 18 carbon atoms in the molecules thereof, (3) glyceryl esters of unsaturated aliphatic carboxylic acids having 16 to 18 carbon atoms and one to three double bonds, (4) succinimide, (5) acrylamide, and (6) aspartic acid, and the total concentration of organic compounds from both said groups is from 1 to 100 grams per liter with the mole ratio of $CrO_3$ to the total of aliphatic compounds of both said groups within the range of 5:1 to 0.8:1.

An essential part of this invention is the discovery that a solvent medium containing a combination of chromic acid with the polyfunctional aliphatic compounds of first and second groups as noted above will undergo a chemical reaction, akin to interpolymerization, after the evaporation of the solvent, and upon further heating to 150–200° C., the resulting material passes through a microcrystalline stage to form a coating of high surface area. The interpolymeric structure, which apparently results from the formation of some sort of chemical bonding between the chromic acid residue and the functional groups of the aliphatic compounds, after the drying process, is substantially insoluble in water even though substantially all the chromium remains in the hexavalent state, and the coating is adherent to the metal surface and to organic coatings applied thereto. The resultant film is a bond of sufficient affinity for both the metal surface and the applied organic paint coating, such as to withstand highly abrasive treatment, flexing, forming or shaping operations, and severe corrosive atmospheric conditions.

The principal active inorganic ingredient in the bonding coat composition of the present invention, chromic acid is present in the solution to the extent of about 1 to 400 grams per liter (0.01–4 M) ordinarily 25–50 grams per liter, and for coating steel preferably 30–45 grams per liter.

Water is the preferred solvent for most of the compositions with the scope of this invention. However, certain of the higher molecular weight organic compounds which may be used to form suitable corrosion inhibiting coatings, such as sebacic acid, are only sparingly soluble in water. In compositions containing these higher molecular weight compounds, it is desirable to use a non-aqueous solvent in which both chromic acid and the organic material are soluble, and the solvent must be one which is not readily oxidized by chromic acid. Tertiary butyl alcohol is the preferred organic solvent for the reason that it is a good solvent for the chromic acid and the higher molecular weight, polyfunctional aliphatic compounds and their derivatives used in the compositions of the present invention, while at the same time is not attacked by chromic acid under the conditions of use prescribed herein. Other alcohols are less desirable because of the limited solubility of chromic acid therein or because they are oxidized by the chromic acid.

The organic compounds for use in the composition and process of the present invention may be selected from a wide range of polyfunctional acids and acid derivatives, the functional groups, in addition to the carboxyl group, including the keto group, the olefinic double bond, the amine, the amide, and the imide groups. The following are typical of compounds which have been found suitable:

| | (Molecular weights are given to the nearest whole number) |
|---|---|
| Succinic acid:<br>HOOC—$(CH_2)_2$—COOH | (Mol wt.=118). |
| Succinimide:<br>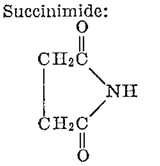 | (Mol wt.=99). |
| Acrylic acid:<br>$H_2C$=CHCOOH | (Mol wt.=72). |
| Acrylamide:<br>$H_2C$=CHCONH | (Mol wt.=71). |
| Adipic acid:<br>HOOC—$(CH_2)_4$—COOH | (Mol wt.=146). |
| Pimelic acid:<br>HOOC—$(CH_2)_5$—COOH | (Mol wt.=160). |
| Suberic acid:<br>HOOC—$(CH_2)_6$—COOH | (Mol wt.=174). |
| Azelaic acid:<br>HOOC—$(CH_2)_7$—COOH | (Mol wt.=188). |
| Sebacic acid:<br>HOOC—$(CH_2)_8$—COOH | (Mol wt.=202). |
| 1,12-dodecanedioic acid:<br>HOOC—$(CH_2)_{10}$—COOH | (Mol wt.=226). |
| 1,13-tridecanedioic acid:<br>HOOC—$(CH_2)_{11}$—COOH | (Mol wt.=240). |
| 1,14-tetradecandioic acid:<br>HOOC—$(CH_2)_{12}$—COOH | (Mol wt.=254). |
| 2,3-dimethylsuccinic acid:<br>HOOC—CHCHCOOH<br>$CH_3$ $CH_3$ | (Mol wt.=146). |
| 2,3-dimethylglutaric acid:<br>HOOC—CH—CHCH$_2$—COOH<br>$CH_3$ $CH_3$ | (Mol wt.=160). |
| 2-ethylsuberic acid:<br>HOOC—CH—$(CH_2)_5$—COOH<br>$C_2H_5$ | (Mol wt.=202). |
| Itaconic acid:<br>$H_2C$—COOH<br>C—COOH<br>$CH_2$ | (Mol wt.=130). |
| Glutaconic acid:<br>HC—COOH<br>HC<br>$H_2C$—COOH | (Mol wt.=130). |
| Aconitic acid:<br>$H_2C$—COOH<br>C—COOH<br>HC—COOH | (Mol wt.=174). |
| Levulinic acid:<br>$H_3C$—C=O<br>$(CH_2)_2$<br>COOH | (Mol wt.=116). |
| 5-ketohexanoic acid:<br>$H_3C$—C=O<br>$(CH_2)_3$<br>COOH | (Mol wt.=130). |
| Gamma-ketopimelic acid [1]:<br>COOH<br>$(CH_2)_2$<br>C=O<br>$(CH_2)_2$<br>COOH | (Mol wt.=174). |
| Drying oils [2]:<br>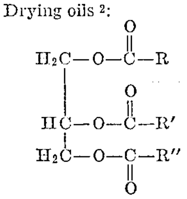 | Wherein R, R′, and R″ are alkyl radicals having from 12–18 carbon atoms, and 1–3 double bonds. |

[1] 3 Ketoheptanedioic acid.
[2] Glyceryl esters of unsaturated fatty acids.

The total aliphatic compound concentration found to be best adapted to the purposes of the invention lies between about 1 and 100 grams per liter, preferably about 20–65 g.p.l. and in molecular proportion of the chromic acid to the polyfunctional aliphatic compounds between 5:1 to 0.8:1. At least 60%, and preferably 65–70%, of the total weight of the polyfunctional aliphatic compounds of the first group is one of succinic acid, adipic acid, and sebacic acid, but not more than 90% of the total weight of the polyfunctional aliphatic compounds of this group is succinic acid. For example, of a total weight of aliphatic compounds between 10 and 35 grams per liter, succinic acid, adipic acid or sebacic acid preferably constitute about 6–25 grams per liter and other polyfunctional aliphatic compounds about 4–20 grams per liter. These three compounds, and particularly succinic acid in combination with another member of the designated groups, have been found to impart superior adhesion and microcrystalline properties to the coating. Although succinic acid affords excellent paint adhesion when used as the only polyfunctional organic compound, it does not completely react with chromic acid under the conditions of the drying process to a degree sufficient to form a water-insoluble interpolymer layer on the metal surface, Therefore, others of the polyfunctional compounds are combined with succinic acid in order to provide a suitable coating having the desired degree of microcrystallinity.

For these reasons, when succinic acid is used as one ingredient of the coating mixture, it constitutes not more than about 90% of the total weight of the aliphatic compounds present in the solution and is used in combination with one of the other polyfunctional compounds prescribed, such as succinimide, pimelic acid, acrylic acid, including water soluble polymers thereof, acrylamide and its water soluble polymers, 2,3-dimethylglutaric acid, 2,3-dimethylsuccinic acid, levulinic acid, itaconoic acid, aconitic acid or one of the high molecular weight aliphatic acid esters known as drying oils. The chromic acid solution may also contain a non-ionic wetting agent such as an alkylphenoxypolyoxyethylene ethanol in concentrations up to about 3 grams per liter commercially available as nonylphenoxypolyoxyethylene ethanol.

Before applying the bonding coating composition of this invention to a metal surface, the metal should be thoroughly cleaned. The use of a commercial alkaline cleaning composition which combines washing and mild abrasive treatments may be employed for this purpose and has been found satisfactory, although a preferred method is to immerse the metal base in an aqueous trisodium phosphate-sodium meta-silicate cleaning solution, heated to about 70° to 82° C. (160–180° F.) for a minute or thereabouts and then rinse in warm water. A similar, but more alkaline cleaning solution may be constituted by dissolving 15 grams per liter each of tetrasodium pyrophosphate and sodium orthosilicate in water.

In some circumstances the application of an etching solution to the metal surface may be indicated, in order to more adequately prepare the surface for the bonding coating solution. Such an etching solution may suitably include an aqueous phosphate-chlorate solution which contains 0.5–20 grams of phosphoric acid per liter and an alkali metal chlorate in an amount from 1 to 10 grams per liter, and have a pH of less than 2.7. Another suitable etching solution contains 5–40 grams per liter of sodium, potassium or ammonium dihydrogen phosphate. An ammonium dihydrogen phosphate solution of preferably about 20 grams per liter is most satisfactory.

In another embodiment of the invention, the use of an etching agent may be incorporated in the bonding coating composition. Suitable ingredients for this purpose are phosphoric acid and hydrofluoric acid, the latter being preferred, in concentrations of about 1–10 grams per liter of the bonding coating solution. A mixture of phosphoric acid (about 2.8–8.6 grams per liter) and hydrofluoric acid (about 1–3.5 grams per liter) is usually indicated in order to achieve the desired degree of etch on zinc surfaces, such as galvanized steel and the like.

Following the cleaning, and optional etching of the metal, the bonding coating solution is applied to the metal surface by spraying, roller-coating, or dipping, which surface is then dried and baked for a suitable period of time, for example for about 1–10 minutes, at a temperature between about 155° and 205° C. (310° and 400° F.). The preferred baking temperature varies somewhat according to the particular coating composition used. Infrared or radiant heat is preferred over convection heating.

In the circumstance in which tertiary butyl alcohol is used as a solvent, a baking temperature of about 100°–172° C. (212–340° F.) is sufficient. When water alone is the solvent, a temperature of 176°–205° C. (350°–400° F.) and about 193°–198° C, is preferred. Both water and tertiary butyl alcohol can be used together as a mixed solvent, provided adequate solubility of the organic compounds is assured in which case the baking temperature is preferably within the range of 176° C.–205° C. (350°–400° F.).

During the drying and baking process, the solvent is driven off, and the non-volatile solid materials in the solution precipitate initially as a microcrystalline deposit on the metal surface. This microcrystalline deposit then apparently undergoes a metamorphosis through a polymerization reaction, and fuses to a permanent bonding coat containing hexavalent chromium uniformly dispersed throughout the polymeric structure. The presence of the hexavalent chromium in the deposit is readily confirmed by spectrographic means, and the polymeric nature of the coating is indicated by the fact that exposure of the deposit to boiling water for an extended period of time does not result in the leaching out of the heaxavalent chromium into the water phase.

According to a preferred embodiment of the present invention, a drying oil, e.g., linseed, tung, soybean, castor, cottonseed or coconut oil, is applied to the metal surface either just before or simultaneously with the application of the coating solution. When the solvent for the coating solution is to be water, it is preferred to use a water-dispersible oil such as linseed oil which has been reacted with ethylene oxide to the extent that it is rendered water soluble. This material is added to the coating solution in an amount between 0.1–10 grams per liter. When the solvent medium for the coating composition is tertiary butyl alcohol, a drying oil such as boiled linseed oil or tung oil may be used along with the other ingredients.

Another method of applying a drying oil to the metal surface, in the practice of the present invention, is to dissolve the oil in a volatile organic solvent such as perchloroethylene, the concentration of the oil in the solvent being up to about 50 grams per liter, and then applying the solution to the metal surface. Following application of the drying oil solution, the solvent is allowed to evaporate and the bonding coating solution is then applied, and the coated metal surface is then heated as in the previously described method to fix the bonding coating preparatory to applying the paint.

While this aspect of the invention is not to be understood as limited to any specific theory or reaction mechanism, it is believed that the drying oils react with the chromic acid polyfunctional aliphatic compound interpolymer possibly through their carboxyl groups and/or olefinic linkages and become chemically combined with the coating ingredients. The olefinic bonds in the drying oils would appear to permit molecular crosslinking, the result of which would be a more adherent bond between the paint and the metal surface thus eliminating the need for an etch as previously described.

After the coating has been applied and heat treated as described, a suitable organic paint may be applied thereover. Typical of organic paints compatible with the coatings of the present invention are those in which the film-forming factor of the paint is polymeric in nature such as the epoxy resins, e.g., reaction products of epichlorohydrin with a polyhydric phenol or a phenol-formaldehyde condensate; the vinyl resins, homopolymers and copolymers, e.g., polyvinyl chloride, polyvinyl fluoride, polyvinyl acetate, polyvinyl butyral, etc.; the acrylic ester resins, e.g., homopolymers and copolymers of acrylic and methacrylic acid esters; the cellulose-based resins, e.g., cellulose acetate, nitrocellulose and cellulose acetate butyrate; the polyester resins, such as esters of maleic anhydride, tetrahydrophthalic anhydride polyhydroxy alcohols or glycols; polyurethanes, e.g., reaction products of hydroxy-containing resins and diisocyanates; silicones; amine resins, e.g., condensation products of urea-formaldehyde and melamine formaldehyde; and phenolic baking resins, such as the condensation products of phenol and formaldehyde. These organic paints may be applied so as to give a coating thickness as applied, of 0.1 to 20 mils when used in corrosion-type coatings, but generally the thickness of the coating is controlled so as to be within the range of about 0.2 to 10 mils, depending upon the means of application, and preferably is 0.2 to 1 mil. The painted article then is heated for a sufficient period of time to achieve removal of solvent and completion of any polymerization or intermolecular condensation reaction involved in order to give a substantially dry organic coating. Depending upon the solvent and film-forming factor of the paint, temperatures in the range of about 21° to 315° C. (70° to 600° F.) may be used for periods of time ranging from a few minutes up to about 5 hours. However, commercially acceptable paints are those which achieve their final dried condition at temperatures up to about 121° C. (250° F.) in about 10 minutes to 20 minutes. Characteristics of the above-mentioned organic paints and methods for applying these paints to surfaces are discussed more extensively in the following publications: American Paint Journal, September 1963, page 112A; American Finishing Guide Book, Directory for 1963, Plastics Publication, Inc., page 537; and Finishing Handbook and Directory 1963, Product Finishing, Sawell Publication Ltd., London, page 129. These publications are hereby incorporated by reefrence in the present specification.

The preferred organic film-forming components of paints to be applied over the corrosion inhibiting bonding coats of the present invention, as noted above, include the polyacrylic esters, the epoxy resins, and water soluble condensation polymers. These paints, noted especially for their property of forming tough, but pliable films, when applied to metal surfaces treated according to the method of this invention, adhere firmly and uniformly to surfaces under simulated in-use conditions prescribed for their evaluation in standard methods of testing.

The organic paints may be applied by specific methods recommended by the manufacturer for applications such as brushing, spraying, dip-coating, and the like as well as by electrolytic deposition processes, commonly referred to as "electrocoated." The electrocoated paints, which are ordinarily applied by making the object to be coated the anode in an electrolytic cell in which the paint coating material is dispersed in a dilute aqueous electrolyte, are becoming increasingly important in the automotive and the household appliance industries. The corrosion-inhibiting bonding coats of the present invention which afford the most effective results with electrolytically deposited paint coatings are those applied in combination with drying oils or drying oils rendered water soluble as by reaction with ethylene oxide to form polyoxyethylenethanol side chains, or with maleic anhydride.

The corrosion inhibiting bonding coats of this invention do not interfere with spot or seam welding operations for joining metal parts together. Spot and seam welding the accomplished with a high voltage, high amperage electric current of short duration, which current passes through the metal surfaces being joined and the heat generated by the resistance of the metals causes them to fuse. Hence, any coatings on the surface of the metals should minimize interference with the welding process, which must be done prior to the application of paints, while at the same time the corrosion-inhibiting bonding coat must retain its integrity after the spot or seam welding operation so that the corrosion inhibiting and bonding properties will not be impaired after paint is applied. The corrosion inhibiting and bonding coats of the present invention have been found to come up to these requirements and to perform their function under the rigorous conditions prescribed for testing procedures.

In order that those skilled in the art may better understand the process and compositions of the present invention, the following specific examples are offered.

PREPARATION OF TEST PANELS

Steel test panels (4" x 12") are prepared for the application of a corrosion-inhibiting bonding coat according to the method of ASTM procedure D–609. The panels are cleaned by dipping them in a solution containing 15 grams per liter each of tetrasodium pyrophosphate and sodium orthosilicate, the solution being maintained at a temperature of 71°–82° C. (160°–180° F.). They are then rinsed with warm water. In those examples in which an etching solution is used prior to applying the corrosion inhibiting bonding coating, this etching solution is designated as one of the following:

| Etch Solution 1: | g./l. |
|---|---|
| $NH_4H_2PO_4$ | 15 |
| $NaClO_3$ | 5 |
| 85% $H_3PO_4$ | 0.5 |
| A non-ionic wetting agent used, nonylphenoxy-polyethyleneoxyethanol | 0.5 |
| Etch Solution2: $NH_4H_2PO_4$ | 20 |

In those examples in which the bonding coating solution contains etching ingredients, specified concentrations are noted.

APPLICATION OF BONDING COATING AND PAINT

The bonding coating compositions of the present invention are applied by dipping the test panel into the coating solution, draining excess solution from the panel, and air dried at room temperature after which they are placed in an oven maintained at 194°–199° C. (380°–390° F.) and remain in the oven for 6 minutes. If the coating composition contains tertiary butyl alcohol as a solvent, the oven temperature is maintained at 155°–171° C. (310°–340° F.). The cooled and coated panels are painted, either by dip-coating or by electrocoating, as indicated, with a layer of paint of the type noted.

TESTING

Tests are carried out to determine the durability and resistance of the paint layer to various physical and chemical treatments, in comparison with a commercial standard.

Mandrel test (blending) (ASTM–D522)

The conical mandrel test is carried out by the procedure of ASTM test D–522. Briefly, the testing method consists in deforming a paint-coated metal panel by fastening the panel tangentially to the surface of a conical steel mandrel and forcing the sheet to conform to the shape of the mandrel by means of a roller bearing, rotatable about the long axis of the cone and disposed at the angle of the conical surface, the angle of deformation or arc travel of the roller bearing being approximately 180°. Following the deformation, a strip of glass fiber tape coated with a pressure-sensitive adhesive is pressed against the painted surface on the deformed portion of the test panel and is then quickly removed. The coating is evaluated qualitatively according to the amount of paint removed by the adhesive on the tape, in comparison with the condition of a standard test panel.

Impact test

In the impact test, a metal ram of specified weight, in pounds, with a hemispherical contact surface is allowed to drop from a predetermined height in inches onto the test panel. The impact is measured in inch-pounds and several tests may be made with differently weighted rams. Paint removal is measured qualitatively on the impacted (concave) surface by inspection, and on the convex surface by the application and removal of the pressure sensitive adhesive side of a strip of glass fiber tape, in comparison with the condition of a standard test panel.

Corrosion resistance test (ASTM D–117)

Corrosion resistance of the painted panels is measured by means of the standard salt spray (fog) test for paints and varnishes, ASTM D–117. In this test, the test panels are placed in a chamber kept at constant temperatures where they are exposed to a fine spray (fog) of a dilute 5% salt solution for specified periods of time, rinsed in water and dried. The extent of corrosion and paint removal on the test sheets are then compared with the standard by visual inspection.

Paint films

The paint films tested include a commercial white alkyd enamel top coat, a commercial acrylic primer, a commercial epoxy primer, a commercial water-based primer, and commercial water-based red oxide primer for electrocoating.

Note: The "standard" or control panels used herein for evaluation of the coatings of the present invention are supplied by a manufacturer of bonding coating and corrosion inhibiting compositions, and are prepared in accordance with this manufacturer's specifications which are generally accepted as standards for performance evaluation of bonding and corrosion inhibiting coatings in the United States in the automotive and household appliance industries. In general, the procedure involves spray-cleaning the metal with a phosphate-ortho silicate cleaning solution heated to about 70° C. (158° F.), rinsing with clear water, dip coating the test panels in a solution containing about 5 grams of zinc acid phosphate per liter, about 7 grams of nitrate per liter, and less than 1 gram of nitrite per liter, and the temperature of the coating solution maintained at about 70° C. (158° F.) during the coating operation which requires about 1 minute. Thereafter, the test panel is rinsed in cool flowing water, and then immersed in a solution of a dilute chromic acid solution (1 gram per liter) or equivalent. The test panel is dried by heating to 100° C.–

(5) Film integrity exceptionally good for the test used.

Where the observed condition of a test panel is better than one of the numerical values but poorer than the next higher value would indicate, a plus (+) sign is used to so indicate the condition.

EXAMPLE I

Aqueous bonding coating solutions of the composition noted below, and containing 0.5 gram of polyoxyethylated nonylphenol, are applied to steel panels as described above, and dip-coated with a commercial alkyd resin enamel (white), baked at about 160° C. (325° F.) for 20 minutes, with the results shown in the table of data below.

TABLE I

| Solution No. | Ingredient | Conc., g./l. | Mole Ratios $CrO_3$ Organic | Mole, Percent | Etch Solution, No. | Conical Mandrel | Impact Test at 80 in. lbs. Concave | Impact Test at 80 in. lbs. Convex | Salt Spray 168 hrs. |
|---|---|---|---|---|---|---|---|---|---|
| 1 | $CrO_3$ | 40 | 1.6:1 | 61.5 | 1 | 3 | 4 | 4 | 3 |
| | Succinic acid | 20 | | 26.2 | | | | | |
| | Itaconic acid | 10 | | 12.3 | | | | | |
| 2 | $CrO_3$ | 40 | 1.5:1 | 59.6 | 1 | 2+ | 3 | 3 | 5 |
| | Succinic acid | 20 | | 25.4 | | | | | |
| | Succinimide | 10 | | 15.0 | | | | | |
| 3 | $CrO_3$ | 40 | 0.73:1 | 42 | None | 4 | 4 | 4 | 4 |
| | Succinic acid | 40 | | 36.2 | | | | | |
| | Succinimide | 20 | | 21.3 | | | | | |
| | $H_3PO_4$ | 3.6 | | | | | | | |
| 4 | $CrO_3$ | 40 | 1.7:1 | 62.5 | 1 | 2+ | 3 | 3 | 4+ |
| | Adipic acid | 20 | | 21.9 | | | | | |
| | Succinimide | 10 | | 15.6 | | | | | |
| 5 | $CrO_3$ | 40 | 1.7:1 | 63.5 | 1 | 2+ | 4 | 3 | 3 |
| | Succinic acid | 20 | | 27.0 | | | | | |
| | 2,3-dimethylglutaric acid | 10 | | 9.5 | | | | | |
| 6 | $CrO_3$ | 40 | 1.5:1 | 60.6 | 1 | 3 | 4 | 3 | 3 |
| | Succinic acid | 20 | | 25.8 | | | | | |
| | Levulinic acid | 10 | | 13.6 | | | | | |
| 7 | $CrO_3$ | 40 | 1.6:1 | 61.5 | 1 | 3 | 4 | 4 | 3 |
| | Succinic acid | 20 | | 26.2 | | | | | |
| | 5-ketohexanoic acid | 10 | | 12.3 | | | | | |
| 8 | $CrO_3$ | 40 | 1.7:1 | 62.5 | 1 | 3 | 3 | 3 | 4 |
| | Succinic acid | 20 | | 26.6 | | | | | |
| | 2,3-dimethylsuccinic acid | 10 | | 10.9 | | | | | |
| 9 | $CrO_3$ | 40 | 1.9:1 | 66.3 | 2 | ---------- | 4 | 4 | 3+ |
| | Succinic acid | 14.1 | | 21.1 | | | | | |
| | 2,3-dimethylsuccinic acid | 10.7 | | 12.6 | | | | | |
| 10 | $CrO_3$ | 40 | 1.2:1 | 54.2 | 2 | ---------- | 4 | 4 | 2+ |
| | Succinic acid | 24.2 | | 28.7 | | | | | |
| | 2,3-dimethylsuccinic acid | 18.5 | | 17.1 | | | | | |
| 11 | $CrO_3$ | 40 | 0.8:1 | 45.5 | None | 3 | 3 | 3 | 4 |
| | Succinic acid | 40 | | 38.6 | | | | | |
| | 2,3-dimethylsuccinic acid | 20 | | 15.9 | | | | | |
| | $H_3PO_4$ | 3.6 | | | | | | | |
| 12 | $CrO_3$ | 40 | 1.9:1 | 66.3 | 2 | 3 | 3 | 3 | 4+ |
| | Succinic acid | 14.9 | | 21.1 | | | | | |
| | Pimelic acid | 12.2 | | 12.6 | | | | | |
| 13 | $CrO_3$ | 40 | 2:1 | 66.3 | None | 3 | 4 | 4 | 4 |
| | Succinic acid | 15 | | 21.0 | | | | | |
| | Acrylamide | 5.4 | | 12.7 | | | | | |
| 14 | $CrO_3$ | 40 | 2:1 | 66.3 | None | 3 | 4+ | 5 | 4 |
| | Succinic acid | 15 | | 21.0 | | | | | |
| | Aconitic acid | 13.3 | | 12.7 | | | | | |
| 15 | $CrO_3$ | 40 | 2:1 | 66.3 | None | 3 | 4 | 4 | 3 |
| | Succinic acid | 15 | | 21.0 | | | | | |
| | 5-ketohexanoic acid | 10.9 | | 12.7 | | | | | |
| 16 | $CrO_3$ | 40 | 2:1 | 66.3 | None | 3 | 4 | 3+ | 4 |
| | Succinic acid | 15 | | 21.0 | | | | | |
| | 3-ketoheptane dioic acid | 14.3 | | 12.7 | | | | | |
| 17 | $CrO_3$ | 40 | 2:1 | 66.3 | None | 3 | 4 | 4 | 4+ |
| | Succinic acid | 15 | | 21.0 | | | | | |
| | Glutaconic acid | 10 | | 12.7 | | | | | |
| 18 | $CrO_3$ | 40 | 2:1 | 66.3 | None | 3 | 4 | 4 | 4 |
| | Succinic acid | 15 | | 21.0 | | | | | |
| | Glutaric acid | 10 | | 12.7 | | | | | |

125° C. (212°–258° F.) for a period of two to five minutes until the panel is thoroughly dried.

In the following tables, the efficacy of the bonding coating and paint films are qualitatively evaluated on a numerical scale from 2–5 as follows:

(2) Retention of film integrity less than that of control.
(3) Degree of retention of film integrity approximately equal to that of control.
(4) Degree of retention of film integrity above that of control.

EXAMPLE II

Aqueous bonding coating solutions containing the same amount of the non-ionic wetting agent prescribed in Example I above are applied to steel test panels as described hereinabove, and dip coated with a commercial non-aqueous epoxy resin, primer, a commercial non-aqueous acrylic ester primer, and with a primer of the aqueous type which is a water dispersion of a thermosetting resin and inorganic pigmenting materials, with the results tabulated below.

TABLE II

| Primer | Solution No. | Ingredient | Conc., g./l. | Mole, percent | Etch Solution No. | Conical Mandrel | Impact Test at 80 in. lbs. Concave | Impact Test at 80 in. lbs. Convex | Salt Spray 100 Hrs. | Salt Spray 435 Hrs. |
|---|---|---|---|---|---|---|---|---|---|---|
| Water-base | 1 | $CrO_3$ | 40 | 59.6 | | | | | | |
| | | Succinic acid | 20 | 25.4 | 1 | 4 | 3 | 3 | 3 | 5 |
| | | Succinimide | 10 | 15.0 | | | | | | |
| | 2 | $CrO_3$ | 40 | 42 | | | | | | |
| | | Succinic acid | 40 | 36.2 | None | 4 | 3 | 4 | 4 | 4 |
| | | Succinimide | 20 | 21.3 | | | | | | |
| | | $H_3PO_4$ | 3.6 | ---------- | | | | | | |
| | 3 | $CrO_3$ | 40 | 54.2 | | | | | | |
| | | Succinic acid | 24.2 | 28.7 | 2 | 4 | 3 | 3 | 3 | 5 |
| | | 2,3-dimethylsuccinic acid | 18.5 | 17.1 | | | | | | |
| Epoxy resin | 4 | $CrO_3$ | 40 | 59.6 | | | | | | |
| | | Succinic acid | 20 | 25.4 | 1 | 4 | 3 | 4 | 4 | 5 |
| | | Succinimide | 10 | 15.0 | | | | | | |
| | 5 | $CrO_3$ | 40 | 42 | | | | | | |
| | | Succinic acid | 40 | 36.2 | None | 4 | 3 | 4 | 2 | 4 |
| | | Succinimide | 20 | 21.3 | | | | | | |
| | | $H_3PO_4$ | 3.6 | ---------- | | | | | | |
| | 6 | $CrO_3$ | 40 | 54.2 | | | | | | |
| | | Succinic acid | 24.2 | 28.7 | 2 | 4 | 3 | 3 | 4 | 4 |
| | | 2,3-dimethylsuccinic acid | 18.5 | 17.1 | | | | | | |
| Acrylic ester resin | 7 | $CrO_3$ | 40 | 45.0 | | | | | | |
| | | Succinic acid | 40 | 38.2 | None | 3 | 3 | 3 | 3 | 3 |
| | | Itaconic acid | 20 | 16.8 | | | | | | |
| | | $H_3PO_4$ | 3.6 | ---------- | | | | | | |
| | 8 | $CrO_3$ | 40 | 45.0 | | | | | | |
| | | Succinic acid | 20 | 38.2 | None | 3 | 3 | 3 | 3 | 3 |
| | | Itaconic acid | 20 | 16.8 | | | | | | |
| | | $H_3PO_4$ | 7.2 | ---------- | | | | | | |
| | 9 | $CrO_3$ | 40 | 45.0 | | | | | | |
| | | Succinic acid | 40 | 38.2 | None | 4 | 3 | 3 | 3 | 3 |
| | | Itaconic acid | 20 | 16.8 | | | | | | |
| | | HF | 1.8 | ---------- | | | | | | |
| | 10 | $CrO_3$ | 40 | 42.5 | | | | | | |
| | | Succinic acid | 40 | 36.2 | None | 3 | 3 | 3 | 3 | 3 |
| | | Succinimide | 20 | 21.3 | | | | | | |
| | | HF | 1.8 | ---------- | | | | | | |

EXAMPLE III

In this example the organic bonding coating ingredients are dissolved in tertiary butyl alcohol because of the limited solubility of the aliphatic dicarboxylic acids in water, without applying an etch solution to the metal surface, and in a solvent consisting of equal parts of water and tertiary butyl alcohol, as indicated by the asterisk utilizing the solubilizing effect of succinimide upon sebacic acid. The bonding coating solutions are applied to steel test panels and to galvanized steel test panels as indicated, and the test panels, after drying as previously described, are dip coated with a commercial alkyd resin enamel (white), baked at about 165° C. (330° F.) for 20 minutes, with the results shown in the table of data below.

EXAMPLE IV

The organic bonding coating ingredients are dissolved in tertiary butyl alcohol in the amounts shown in the table below, the test panels are immersed in the solutions as previously described and then placed in an oven and heated as previously described. Commercial electro-coating primer paint made up of a colloidal dispersion (negatively charged) of an organic thermo-setting resin and inorganic pigmenting materials in an aqueous, relatively weak, electrolyte, is used to coat steel test panels by immersing the test panels in the dispersion, and applying a direct current at a potential of 150 volts for about 2 minutes. Initially the current passed is about 6 amperes and diminishes to about 0.1 ampere in the two minute period.

TABLE III

| Solution No. | Ingredients | Conc., g./l. | Mole, Percent | Mole Ratio $CrO_3$/organic | Conical Mandrel | Impact Test Concave | Impact Test Convex | Salt Spray 168 hrs. |
|---|---|---|---|---|---|---|---|---|
| 1 | $CrO_3$ | 40 | 80 | 4.4:1 | 2+ | 3 | 2 | 4 |
| | Sebacic acid | 20 | 20 | | | | | |
| 2 | $CrO_3$ | 30 | 75 | 3:1 | 3 | 3 | 3+ | 5 |
| | 1,12-dodecanedioic acid | 25 | 25 | | | | | |
| 3 | $CrO_3$ | 30 | 75 | 3:1 | 3 | 4 | 4+ | 4 |
| | 1,13 tridecanedioic acid | 26.5 | 25 | | | | | |
| 4 | $CrO_3$ | 30 | 75 | 3:1 | 3 | 4 | 4+ | 4 |
| | 1,14-tetradecanedioic acid | 28 | 25 | | | | | |
| 5* | $CrO_3$ | 30 | 58.0 | 1.4:1 | 3 | 3 | 3 | 4 |
| | Sebacic acid | 20 | 19.0 | | | | | |
| | Succinimide | 13.8 | 23.0 | | | | | |
| 6 | $CrO_3$ | 30 | 75 | 3:1 | 3 | 3 | 3 | 4+ |
| | Suberic acid | 17 | 25 | | | | | |
| 7 | $CrO_3$ | 30 | 75 | 3:1 | 3 | 3 | 3 | 4+ |
| | Azelaic acid | 18.3 | 25 | | | | | |
| 8 | $CrO_3$ | 30 | 75 | 3:1 | 3 | 3 | 3 | 5 |
| | Sebacic acid | 20 | 25 | | | | | |

The deposited paint film is found to be essentially dry upon removal of each test panel from the dispersion. The panels are placed in an oven and baked at a temperature of 175° C. (350° F.) for thirty minutes, and subject to the above-described tests with the results noted in the table below.

TABLE IV

| Solution No. | Ingredients | Conc., g./l. | Mole, Percent | Mole Ratio $CrO_3$/organic | Conical Mandrel | Impact Test Concave | Impact Test Convex | Salt Spray 168 hrs. |
|---|---|---|---|---|---|---|---|---|
| 1 | $CrO_3$ | 30 | 75 | 3:1 | 3 | 3 | 4 | 3 |
| | Sebacic acid | 20 | 25 | | | | | |
| 2 | $CrO_3$ | 40 | 80 | 4.4:1 | 3 | 3 | 4 | 4 |
| | Sebacic acid | 20 | 20 | | | | | |
| | Tung oil [1] | 2 | | | | | | |
| 3 | $CrO_3$ | 40 | 80 | 4.4:1 | 3 | 3 | 4 | 4 |
| | Sebacic acid | 20 | 20 | | | | | |
| | Tung oil [1] | 5 | | | | | | |
| 4 | $CrO_3$ | 40 | 66.3 | 2:1 | 2 | 3 | 3 | 3 |
| | Sebacic acid | 25.7 | 21.1 | | | | | |
| | Pimelic | 12.2 | 12.6 | | | | | |

[1] These amounts of tung oil are insignificant in computing mole percent, considering a calculated molecular weight, based on the fatty acid content, of approximately 355.

What is claimed is:

1. A corrosion-inhibiting bonding coating composition for metal surfaces which consists essentially of a volatile solvent having dissolved therein:

(A) chromic acid in a concentration between about 1 and 400 grams per liter; and (B) an organic component which is composed of at least one aliphatic dicarboxylic acid selected from a first group consisting of (1) succinic acid in the amount of 60% to 90% by weight of said component, and (2) dicarboxylic acids of the structure:

$$HOOC(CH_2)_n\text{—}COOH$$

wherein $n$ is a whole number from 3 to 12, inclusive, in the amount of 60% to 100% by weight of said component, with the remainder of said organic component being a polyfunctional aliphatic compound selected from a second group consisting of:

(1) aliphatic keto-carboxylic acids having from 4 to 14 carbon atoms in the molecules thereof, (2) unsaturated aliphatic carboxylic acids having from 3 to 18 carbon atoms in the molecules thereof, (3) glyceryl esters of $C_{16}$–$C_{18}$ unsaturated aliphatic carboxylic acids having 1 to 3 double bonds, (4) succinimide, (5) acrylamide and (6) aspartic acid, and the total concentration of aliphatic compounds from both said groups is from 1 to 100 grams per liter with the mole ratio of $CrO_3$ to the total of aliphatic compounds of both said groups within the range of 5:1 to 0.8:1.

2. The bonding coating composition as claimed in claim 1 wherein the aliphatic compounds selected from said first group are succinic acid and glutaric acid, and the members of said second group are excluded.

3. The bonding coating composition as claimed in claim 1 wherein the aliphatic compounds selected from said first group are succinic acid and 2,3-dimethylglutaric acid, and the members of said second group are excluded.

4. The bonding coating composition as claimed in claim 1 wherein the aliphatic compounds selected from said first group are succinic acid and pimelic acid, and the members of said second group are excluded.

5. The bonding coating composition as claimed in claim 1 wherein the aliphatic compound selected from said first group is succinic acid and the compound selected from said second group is itaconic acid.

6. The bonding coating composition as claimed in claim 1 wherein the aliphatic compound selected from said first group is succinic acid, and the compound selected from said second group is succinimide.

7. The bonding coating composition as claimed in claim 1 wherein the aliphatic compound selected from said first group is succinic acid, and the compound selected from said second group is levulinic acid.

8. The bonding coating composition as claimed in claim 1 wherein the aliphatic compound selected from said first group is succinic acid, and the compound selected from said second group is 5-ketohexanoic acid.

9. The bonding coating composition as claimed in claim 1 wherein the aliphatic compound selected from said first group is succinic acid, and the compound selected from said second group is 2,3-dimethylsuccinic acid.

10. The bonding coating composition as claimed in claim 1 wherein the aliphatic compound selected from said first group is succinic acid and the compound selected from said second group is acrylamide.

11. The bonding coating composition as claimed in claim 1 wherein the aliphatic compound selected from said first group is succinic acid and the compound selected from said second group is aconitic acid.

12. The bonding coating composition as claimed in claim 1 wherein the aliphatic compound selected from said first group is succinic acid and the compound selected from said second group is 3-ketoheptanedioic acid.

13. The bonding coating composition as claimed in claim 1 wherein the aliphatic compound selected from said first group is succinic acid and the compound selected from said second group is glutaconic acid.

14. The composition as claimed in claim 1 wherein the compound selected from said first group is adipic acid and the compound selected from said second group is succinimide.

15. The composition as claimed in claim 1 wherein the compound selected from said first group is sebacic acid and a compound of said second group is selected from the group consisting of succinimide and drying oils.

16. The composition as claimed in claim 1 wherein the compounds selected from said first group are sebacic acid and pimelic acid, with none of the compounds of said second group.

17. The composition as claimed in claim 1 wherein one compound of said first group is present and is selected from the group consisting of suberic acid, azelaic acid, sebacic acid, undecanedioic acid, dodecanedioic acid, tridecanedioic acid, and tetradecanedioic acid, and none of the members of said second group is present.

18. The composition as claimed in claim 17 in which the solvent is tertiary butyl alcohol.

19. The method which includes the steps of applying to a surface of aluminum, zinc, or ferrous metal, a solution of:

(A) chromic acid in a concentration between about 1 and 400 grams per liter; and (B) an organic component which is composed of at least one aliphatic dicarboxylic acid selected from a first group consisting of (1) succinic acid in the amount of 60% to 90% by weight of said component, and (2) dicarboxylic acids of the structure:

$$HOOC(CH_2)_n\text{—}COOH$$

wherein $n$ is a whole number from 3 to 12 inclusive, in the amount of 60% to 100% by weight of said component, with the remainder of said organic component being a polyfunctional aliphatic compound selected from a second group consisting of (1) aliphatic keto-carboxylic acids having from 4 to 14 carbon atoms in the molecules thereof,
(2) unsaturated aliphatic carboxylic acids having from 3 to 18 carbon atoms in the molecules thereof,
(3) glyceryl ester of $C_{16}$–$C_{18}$ unsaturated aliphatic carboxylic acids having 1 to 3 double bonds,
(4) succinimide,
(5) acrylamide and
(6) aspartic acid, and the total concentration of aliphatic compounds from both said groups is from 1 to 100 grams per liter with the mole ratio of $CrO_3$ to the total of aliphatic compounds of both said groups within the range of 5:1 to 0.8:1, evaporating the solvent from the solution on said surface, heating the metal surface to a temperature within the range of 175°–235° C., (348°–456° F.), whereby the residue of said solution on said metal surface passes through a microcrystalline phase and forms a strongly adhering corrosion inhibiting coating having a high degree of affinity for organic paints.

20. The method of claim 19 wherein said aliphatic compound selected from said first group is succinic acid and the compound selected from said second group is succinimide.

21. The method of claim 19 wherein said aliphatic compound selected from said group is succinic acid and the compound selected from said second group is 2,3-dimethylsuccinic acid.

22. The method of claim 19 wherein the aliphatic compounds are selected from said first group and consist of succinic acid and glutaric acid, and members of said second group are excluded.

23. The method of claim 19 wherein the aliphatic compounds are selected from said first group and consist of succinic acid, pimelic acid, and members of said second group are excluded.

24. The method of claim 19 wherein the aliphatic compound selected from said first group consists of sebacic acid, and a compound of said second group selected from succinimide, and tung oil.

25. The method of claim 19 wherein the aliphatic compound selected from said first group is adipic acid, and the compound selected from said second group is succinimide.

26. The method of claim 19 wherein the aliphatic compound of said first group is selected from the group of aliphatic dicarboxylic acids having the structure:

$$HOOC—(CH_2)_n—COOH$$

wherein $n$ is a whole number from 6 to 12 inclusive, and members of said second group are excluded.

References Cited

UNITED STATES PATENTS

| | | | |
|---|---|---|---|
| 2,393,663 | 1/1946 | Thomas et al. | 148—6.2 |
| 2,480,448 | 8/1949 | Coates | 148—6.21 |
| 2,559,812 | 7/1951 | Watson | 148—6.2 |
| 2,793,932 | 5/1957 | Kahler et al. | 106—14 X |
| 2,887,418 | 5/1959 | Whitby | 148—6.2 |
| 2,927,046 | 3/1960 | Andrade | 106—14 X |

ALEXANDER H. BRODMERKEL, *Primary Examiner.*

L. HAYES, *Assistant Examiner.*